(12) United States Patent
Kowalczyk et al.

(10) Patent No.: US 7,963,685 B2
(45) Date of Patent: Jun. 21, 2011

(54) REAR COMBINATION LAMP

(75) Inventors: John Kowalczyk, Livonia, MI (US);
Tom William Partch, Trenton, MI (US);
Jeff Scott Lossing, Riverview, MI (US);
Douglas George Rosner, Livonia, MI (US); George Saridakis, Ann Arbor, MI (US); Kelley Maria Adams-Campos, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 12/272,410

(22) Filed: Nov. 17, 2008

(65) Prior Publication Data

US 2010/0124073 A1    May 20, 2010

(51) Int. Cl.
*F21V 21/00* (2006.01)
(52) U.S. Cl. .................... 362/545; 362/540; 362/542
(58) Field of Classification Search .............. 362/540, 362/542, 545; 340/478, 479, 464, 467, 468
See application file for complete search history.

(56) References Cited

U.S. PATENT DOCUMENTS

| | | | | |
|---|---|---|---|---|
| 4,556,862 A | * | 12/1985 | Meinershagen | 340/478 |
| 5,136,483 A | * | 8/1992 | Schoniger et al. | 362/545 |
| 5,281,949 A | * | 1/1994 | Durley et al. | 340/433 |
| 5,828,139 A | * | 10/1998 | Slater | 307/10.8 |
| 6,573,830 B2 | * | 6/2003 | Cohen et al. | 340/479 |
| 2003/0107863 A1 | * | 6/2003 | Kelwaski | 361/93.9 |
| 2004/0114384 A1 | * | 6/2004 | Carter et al. | 362/494 |
| 2005/0099286 A1 | | 5/2005 | DeYoung | |
| 2006/0133103 A1 | * | 6/2006 | Muhlbaier et al. | 362/545 |

OTHER PUBLICATIONS

Meter4it Engineering, Sequential/Chase taillights for Ford Mustang by www.meter4it.com/FAQ.htm, 7 pgs., copyright 2008.
Autothing.com Sequential Turn Signals—the Most unique "4 Mustangs Only" accessory! By www.autothing.com/images/Products/ATS%Signals/mustangturnsignals.htm, 3 pgs., copyright 2008.
StylinTrucks.com Sequential LED Tail Lights by www.stylintrucks.com/parts.aspx?selected_prod_ids=1484, 2 pgs., copyright 2008.

* cited by examiner

*Primary Examiner* — Ali Alavi
(74) *Attorney, Agent, or Firm* — Gregory P. Brown; Price, Heneveld, Cooper, DeWitt & Litton, LLP (57) ABSTRACT

A rear combination lamp y for a vehicle includes a rear combination lamp housing with an inboard cavity, an intermediate cavity, and an outboard cavity. First, second, and third light-emitting diodes extend into the inboard cavity, intermediate cavity, and outboard cavity, respectively. A turn signal member is operably connected to the first, second, and third light-emitting diodes and engagement of the turn signal activates the first, second, and third light-emitting diodes sequentially.

18 Claims, 8 Drawing Sheets

REAR COMBINATION LAMP

FIELD OF THE INVENTION

The present invention generally relates to a Rear Combination Lamp assembly and more specifically to a Rear Combination Lamp assembly having a plurality of light-emitting diodes (LEDs) that activate sequentially.

BACKGROUND OF THE PRESENT INVENTION

Rear Combination Lamps are generally installed in a rear portion of a vehicle and are operable to indicate that a vehicle is braking, has its tail lights on, has its hazard lights on, is backing up or is turning.

SUMMARY OF THE INVENTION

One aspect of the present invention includes a Rear Combination Lamp assembly for a vehicle having a Rear Combination Lamp housing with an inboard cavity, an intermediate cavity, and an outboard cavity. First, second, and third light-emitting diodes extend into the inboard cavity, intermediate cavity, and outboard cavity, respectively. A turn signal member is operably connected to the first, second, and third light-emitting diodes and engagement of the turn signal activates the first, second, and third light-emitting diodes sequentially.

Another aspect of the present invention includes a Rear Combination Lamp assembly for a vehicle having an inboard cavity, an intermediate cavity, and an outboard cavity horizontally aligned along a rear portion of the vehicle. A first light-emitting diode extends into the inboard cavity. A second light-emitting diode extends into the intermediate cavity. A third light-emitting diode extends into the outboard cavity. A turn signal is operably connected to the first, second, and third light-emitting diodes and the first light-emitting diode, second light-emitting diode, and third light-emitting diode activate sequentially and deactivate simultaneously when the turn signal is engaged.

Yet another aspect of the present invention includes a method for making a Rear Combination Lamp for a vehicle. The method includes forming first, second, and third cavities in the Rear Combination Lamp assembly. A first light-emitting diode is extended into the first cavity and second and third light-emitting diodes are extending into the second and third cavities. The second and third light-emitting diodes have a maximum light output that is lower than the maximum light output of the first light-emitting diode. A turn signal is provided that is operable between a turn position and a non-turn position. The turn signal is connected to a modulator that controls operation of the first, second, and third light-emitting diodes. The modulator is instructed to activate the first, second, and third light-emitting diodes in a sequential order. The modulator is instructed to keep the first, second, and third light-emitting diodes simultaneously activated for a predetermined length of time. The modulator is also instructed to simultaneously deactivate the light-emitting diodes for a predetermined length of time.

These and other features, advantages, and objects of the present invention will be further understood and appreciated by those skilled in the art upon studying the following specification, claims, and appended drawings.

DETAILED DESCRIPTION OF PREFERRED EMBODIMENTS

Figure 1:
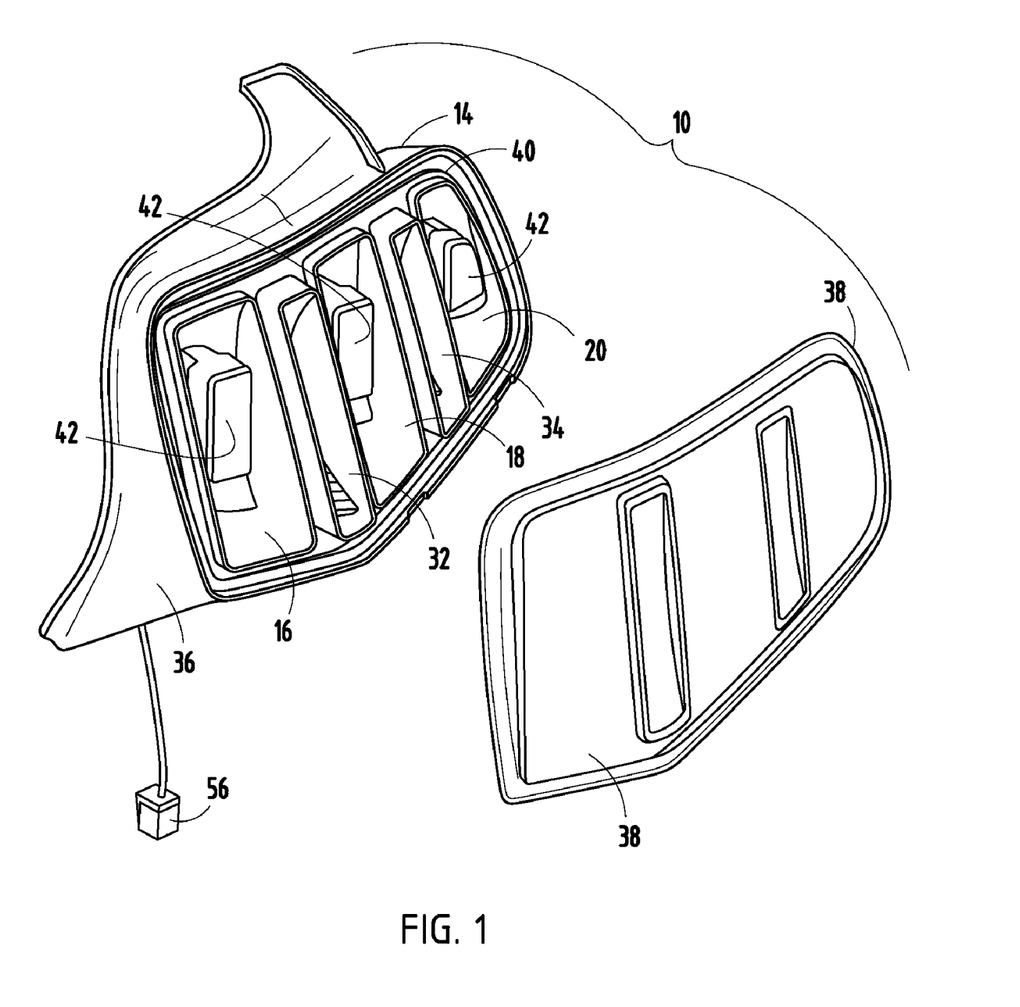
FIG. 1 is a top rear perspective view of one embodiment of a rear combination lamp of the present invention with the lens cover removed.

For purposes of description herein the terms "upper," "lower," "right," "left," "rear," "front," "vertical," "horizontal" and derivatives thereof shall relate generally to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
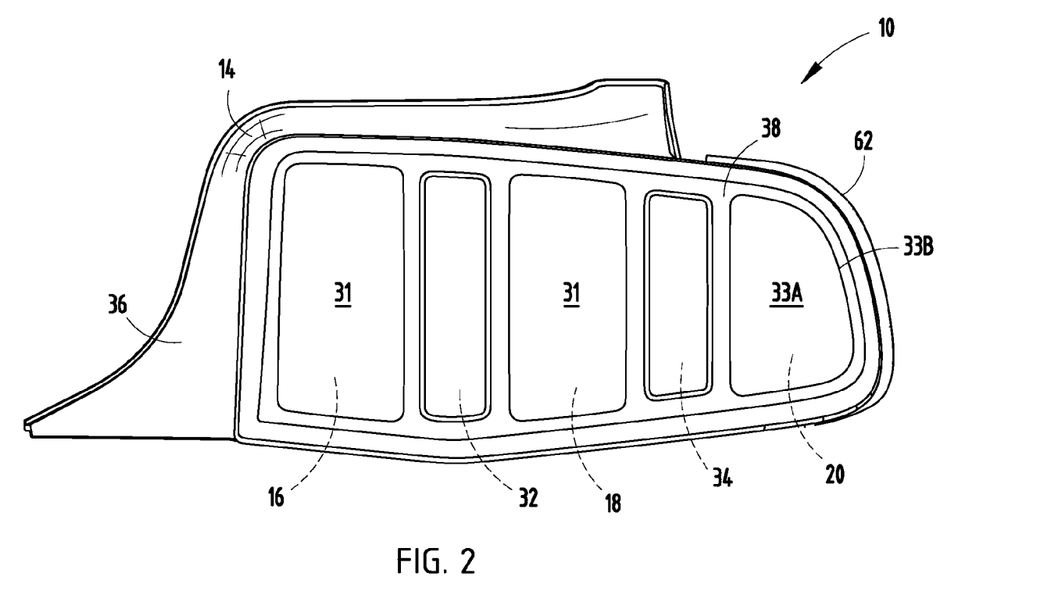
FIG. 2 is a rear elevational view of one embodiment of a rear combination lamp of the present invention.

Referring to FIGS. 1 and 2, the reference numeral 10 generally designates a rear combination lamp for a vehicle 12 having a rear combination lamp housing 14 with an inboard cavity 16, an intermediate cavity 18, and an outboard cavity 20. First, second, and third light-emitting diodes 22, 24, 26 extend into the inboard cavity 16, intermediate cavity 18, and outboard cavity 20, respectively. A turn signal member 28 (FIG. 3) is operably connected to the first, second, and third light-emitting diodes 22, 24, 26 and engagement of the turn signal member 28 activates the first, second, and third light-emitting diodes 22, 24, 26 sequentially.

Figure 3:
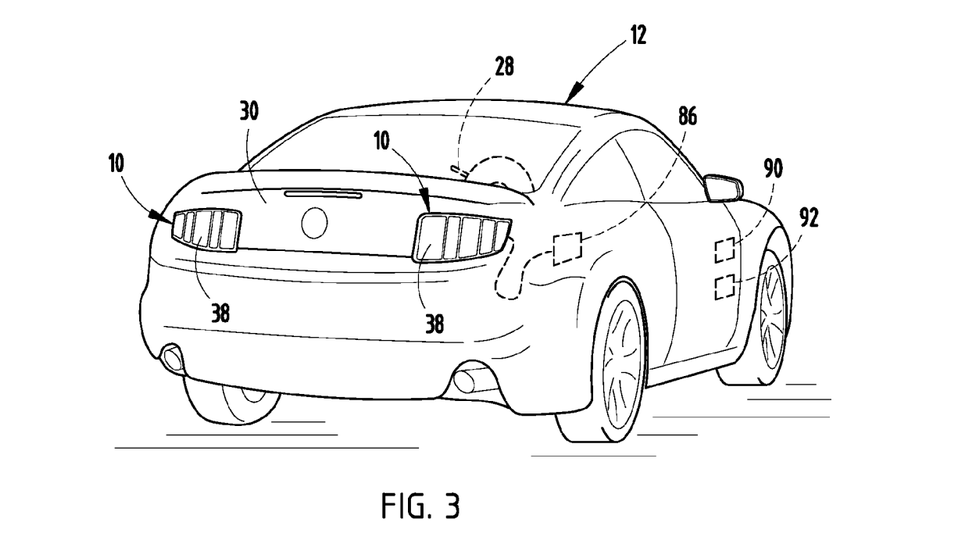
FIG. 3 is a top perspective view of a vehicle incorporating the rear combination lamp of the present invention.
Figure 6:
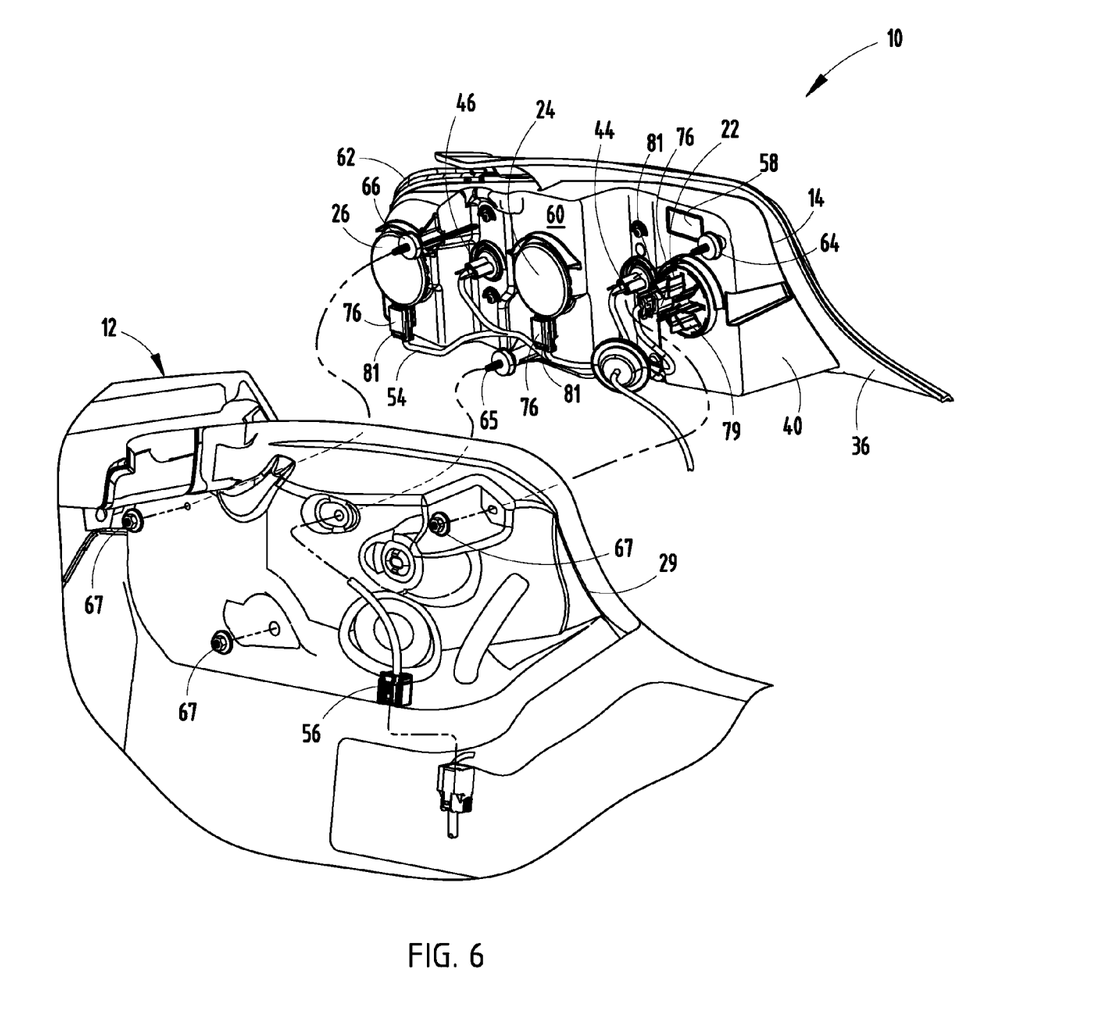
FIG. 6 is a front perspective view of a rear portion of a vehicle prior to installation of one embodiment of a rear combination lamp of the present invention.

Referring now to FIG. 3, the rear combination lamp 10 is adapted for installation in a rear portion 30 of the vehicle 12 in a rear combination lamp receiving aperture 29 (FIG. 6). The inboard cavity 16 and the intermediate cavity 18 include a substantially rectangular shape 31 and the outboard cavity 20 includes a substantially rectangular shape 33A with a substantially concave outer edge 33B. A first backup light cavity 32 is disposed between the first and second cavities 16, 18, and a second backup light cavity 34 is disposed between the second and third cavities 18, 20. The rear combination lamp 14 includes an integral valance/trim panel 36 that adds aesthetic appeal to the rear portion 30 of the vehicle 12.

Figure 4:
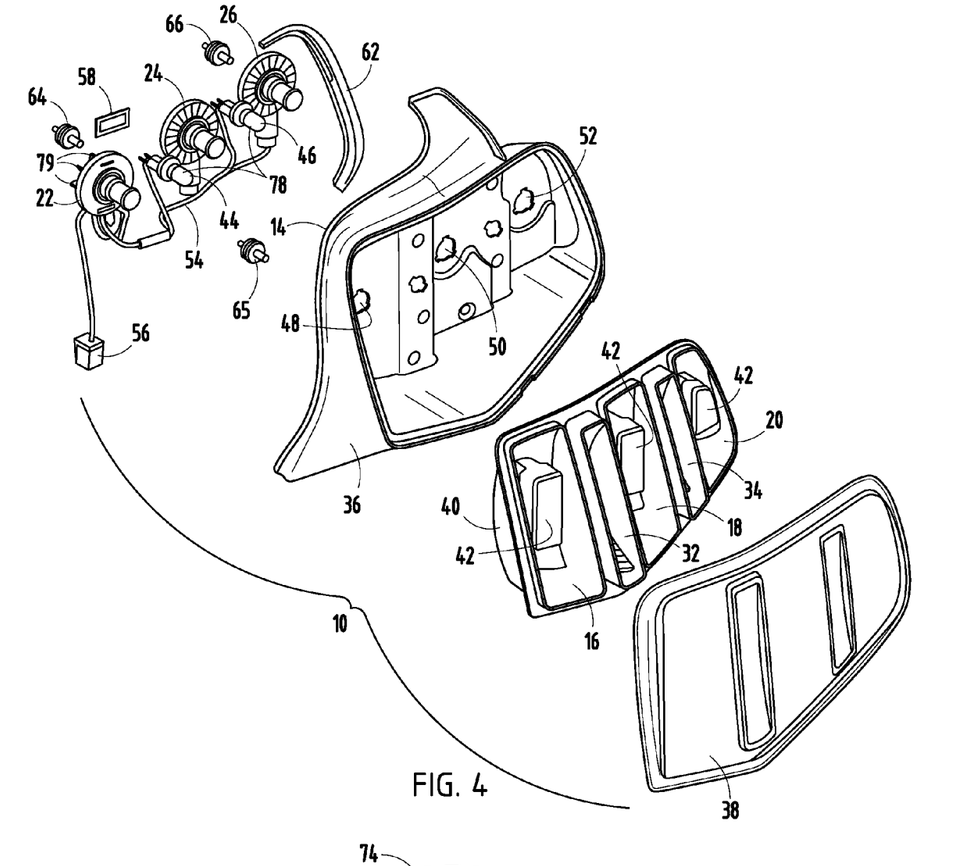
FIG. 4 is an enlarged exploded view of the rear combination lamp of FIG. 2.

Referring now to FIG. 4, the rear combination lamp 10 also includes a cover lens 38 that protects the cavities 16, 18, 20 and light-emitting diodes 22, 24, 26 from damage. The cover lens 38 overlies a bezel 40 and reflex caps 42 which are securely connected with the rear combination lamp 14. The bezel 40 forms each of the cavities 16, 18, 20 of the tail light assembly 10 as well as backup light cavities 32, 34 in which the first and second backup lights 44, 46, extend, respectively. The reflex caps 42 disperse light emitted by the first, second and third light-emitting diodes 22, 24, 26 when the first, second and third light-emitting diodes 22, 24, 26 are activated and also provide the rear combination lamp 10 with a lens reflex function. In addition, the rear combination lamp housing 14 includes first, second and third apertures 48, 50, 52 through which the first, second and third light-emitting diodes 22, 24, 26 extend, respectively. The first, second, and third light emitting diodes 22, 24, 26 extend into the rear combination lamp housing 14 and into the bezel 40 adjacent to the reflex caps 42. A wire harness 54 is connected to each of the first, second, and third light-emitting diodes 22, 24, 26 as well as the backup lights 44, 46 extending into the backup light cavities 32, 34. The wire harness 54 includes a single plug-in 56 to allow easy installation by the manufacturer. A vent 58 is disposed on a side 60 of the rear combination lamp housing 14 to allow ventilation between the inside of the housing 14 and bezel 40. In addition, a gimp 62 is located on an outboard side 64 of the housing 14 and acts to improve fit and appearance of the housing 14 in the rear combination lamp receiving aperture 29 disposed in the rear portion 30 of the vehicle 12. First, second, and third studs 64, 65, 66 extend into the housing 14 and secure the housing 14 and the remainder of the rear combination lamp 10 to the rear portion 30 of the vehicle 12 by fasteners 67 (FIG. 6).

Figure 5:
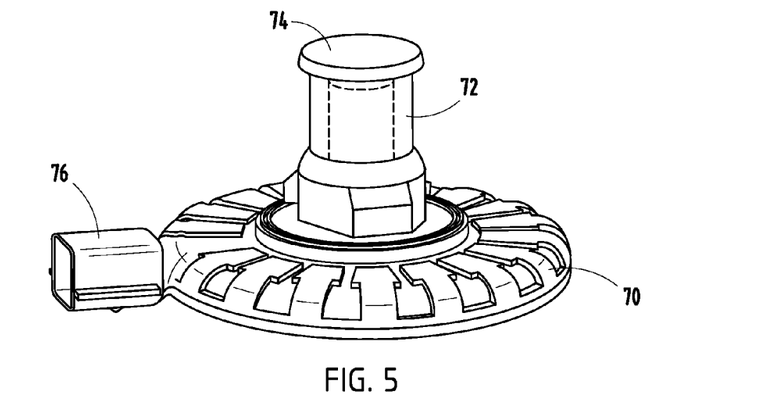
FIG. 5 is a top perspective view of one embodiment of a light-emitting diode of the present invention.

Referring now to FIG. 5, one embodiment of the first, second and third light-emitting diodes 22, 24, 26 includes a base 70 with a light pipe 72 having an optical top cover 74. A plug receiver 76 extends from the base 70 and is adapted to receive a plug (not shown) that provides the necessary power to activate the light-emitting diode. The first light-emitting diode 22 of the inboard cavity 16 has a maximum light output of 70 lumens while the maximum light output of the second and third light-emitting diodes 24, 26 of the intermediate and outboard cavities 18, 20 is 50 lumens. The light-emitting diodes 22, 24, 26 require relatively low wattage and have relatively minimal heat radiation when activated. Incandescent bulbs 78 as are known in the art and shown in FIG. 4, are provided as backup lights 44, 46. It is understood that there may be multiple diodes in each of the first, second and third light-emitting diodes 22, 24, 26.

Figure 7:
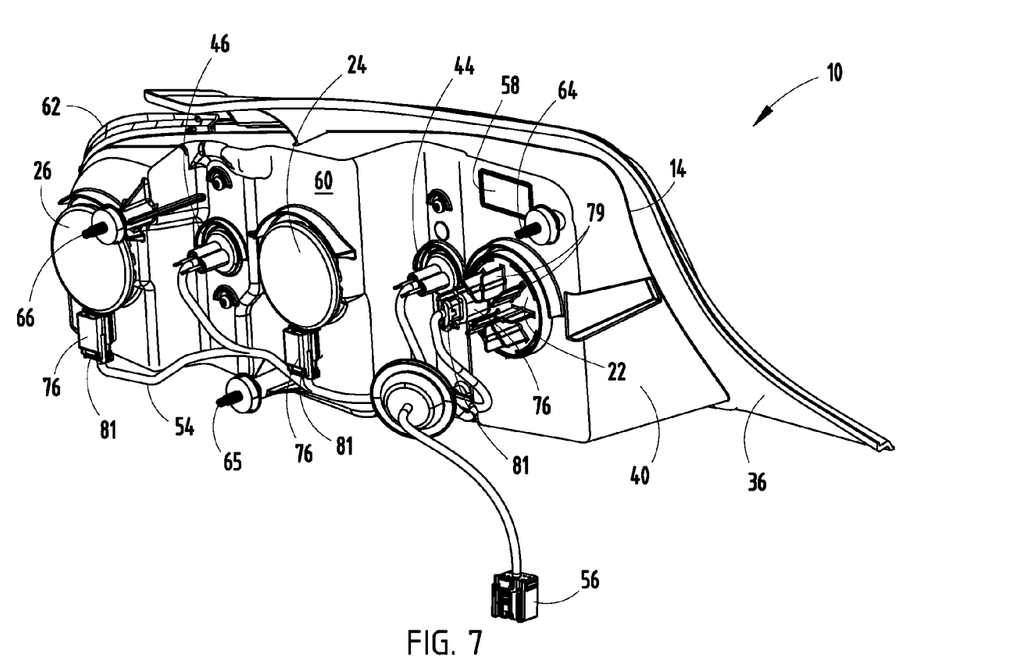
FIG. 7 is a top perspective view of a front portion of one embodiment of a rear combination lamp.
Figure 8:
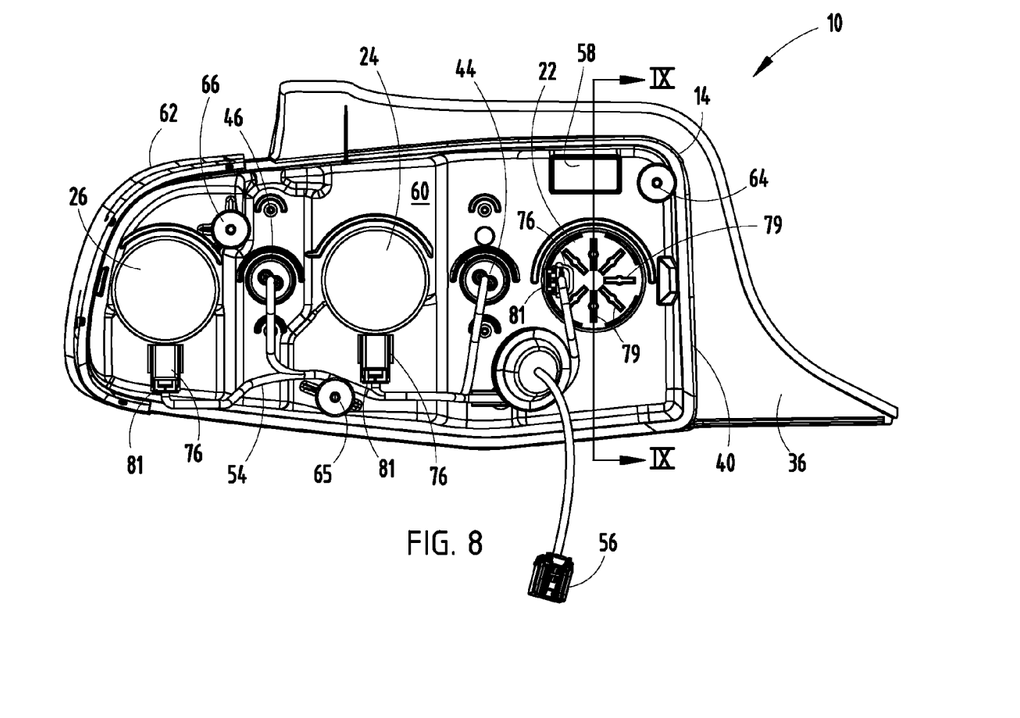
FIG. 8 is a front elevational view of the rear combination lamp of FIG. 7.

Referring now to FIGS. 7 and 8, the first light-emitting diode 22 disposed in the inboard cavity 16 includes a plurality of flanges 79 that extend radially outward from a center portion of the rear of the light-emitting diode 22. In addition, the first light-emitting diode 22 includes a plug receiving aperture 76 that extends perpendicular to the base 70. The second and third light-emitting diodes 24, 26 have plug receiving apertures 76 that extend from a side of the base 70 parallel with the planar extent of the base 70. The plug receiving apertures 76 are designed to receive power plugs 81 connected to the wire harness 54.

Figure 9:
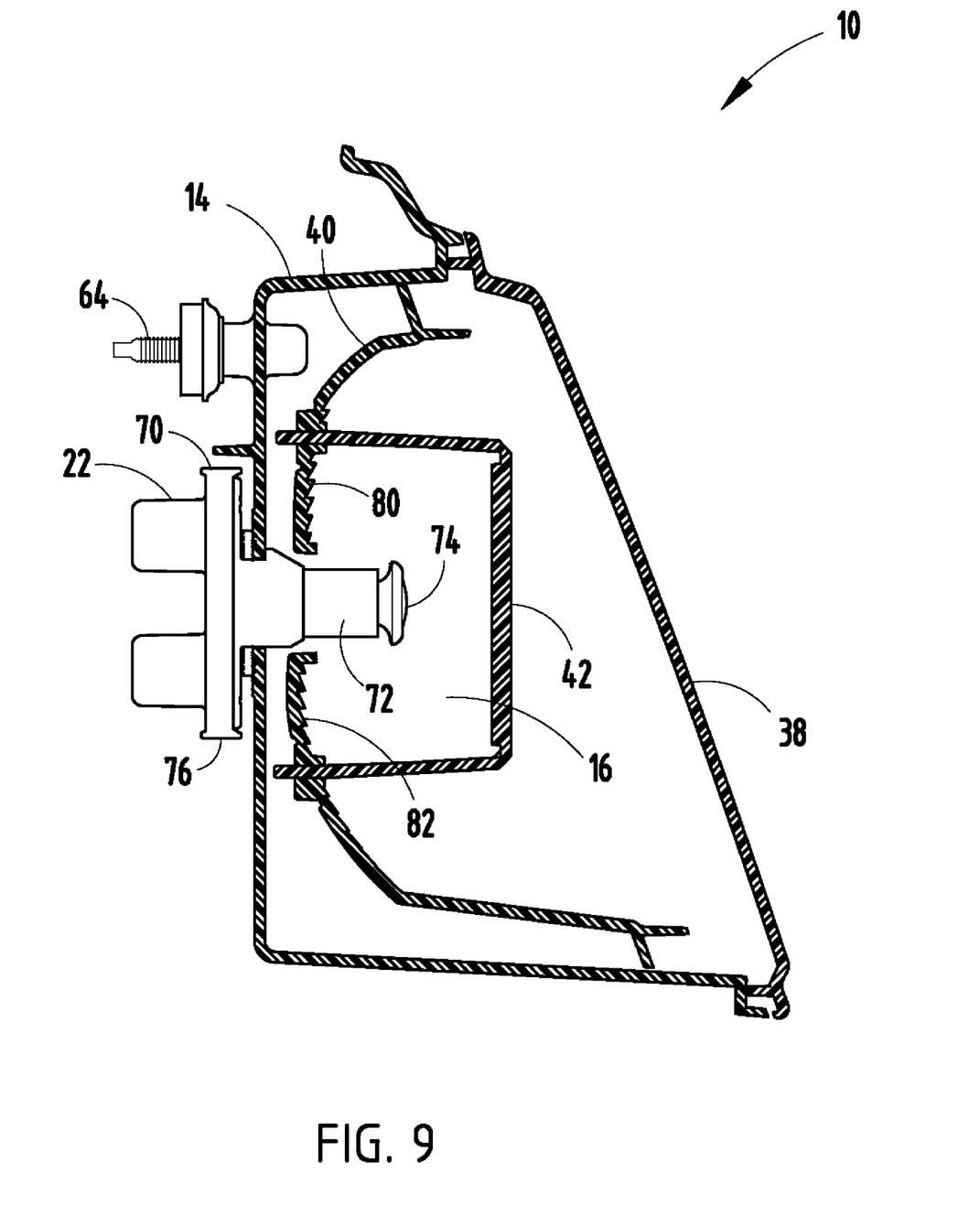
FIG. 9 is a cross-sectional view taken at line IX-IX of FIG. 8.
Figure 10:
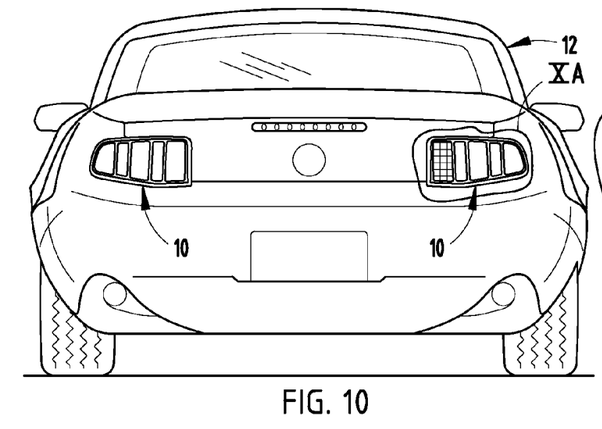
FIG. 10 is a rear elevational view of a vehicle with the inboard turn lamp activated.
Figure 10A:
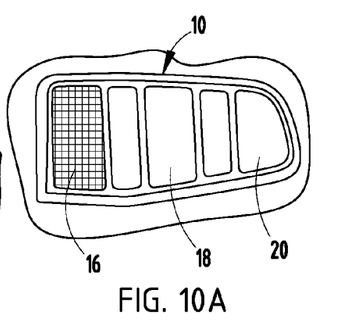
FIG. 10A is an enlarged view of area XA of FIG. 10.

Referring now to FIG. 9, the cover lens 38 extends at an angle relative to the first, second and third light-emitting diodes 22, 24, 26. A reflective member 80 is connected to the bezel 40 and includes angled cuts 82. The reflective member 80 surrounds the first, second and third light-emitting diodes 22, 24, 26 and reflects light outward through the cover lens 38. The reflex caps 42 extend into the bezel 40 and are held thereto by heat stakes.

Figure 11:
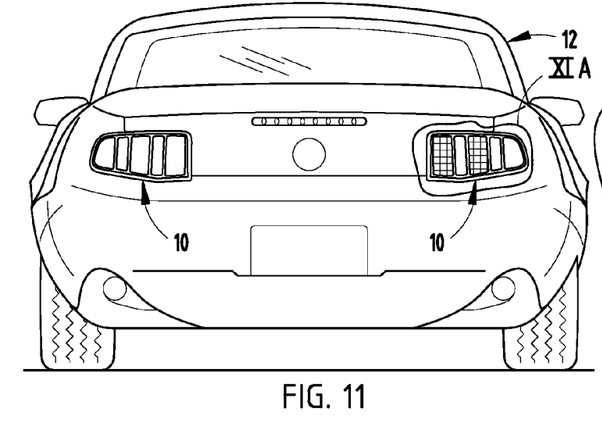
FIG. 11 is a rear elevational view of a vehicle having the inboard and intermediate turn lamps activated.
Figure 11A:
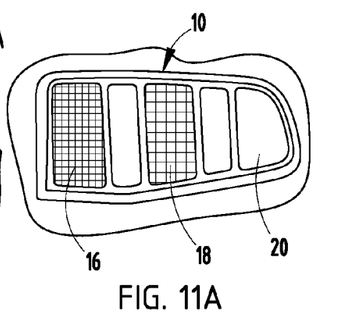
FIG. 11A is an enlarged view of area XIA of FIG. 11.
Figure 12:
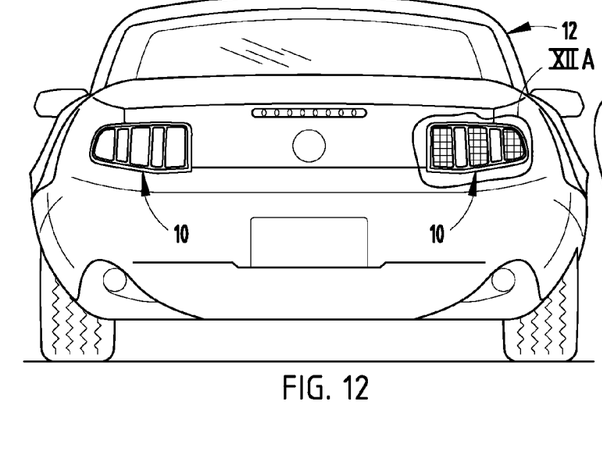
FIG. 12 is a rear elevational view of a vehicle having the inboard, intermediate and outboard turn lamps activated.
Figure 12A:
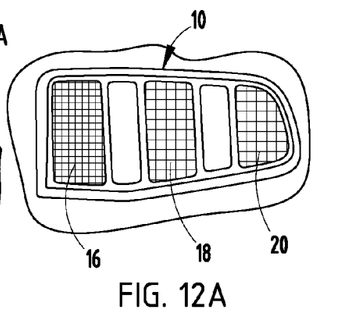
FIG. 12A is an enlarged view of area XIIA.
Figure 13:
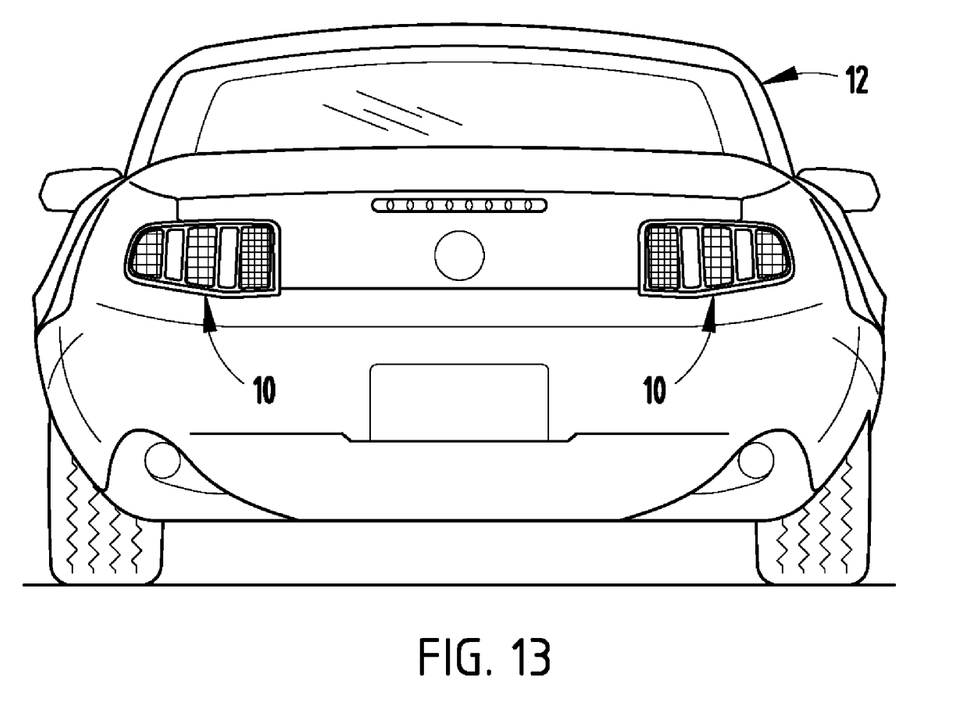
FIG. 13 is a rear elevational view of a vehicle showing the rear combination lamp activated as a result of the braking system being engaged.

Referring now to FIGS. 10-12A, which illustrate one embodiment of a turn signal operation of a vehicle 12, when the vehicle 12 is making a right turn indicated by activation of the turn signal member 28 to a turn-indicating position. When the turn signal member 28 is activated, the first, second and third light-emitting diodes 22, 24, 26 activate sequentially. More specifically, the turn signal member 28 is operably connected with a turn signal system or modulator 86 that instructs the inboard cavity 16 having the first light-emitting diode 22 to activate initially. Next, the turn signal system 86 instructs the intermediate cavity 18 having the second light-emitting diode 24 to activate such that both the first light-emitting diode 22 and the second light-emitting diode 24 are activated as shown in FIGS. 11 and 11A. Next, the turn signal system 86 instructs the third light-emitting diode 26 in the outboard cavity 20 to activate such that the first, second and third light-emitting diodes 22, 24, 26 in the inboard, intermediate and outboard cavities 16, 18, 20 are activated and emitting light. After each of the first, second and third light-emitting diodes 22, 24, 26 has been activated, the first, second and third light-emitting diodes 22, 24, 26 deactivate simultaneously such that none of the first, second and third light-emitting diodes 22, 24, 26 are emitting light. This sequence continues until the turn signal member 28, indicating that the vehicle 12 is making a right turn, is deactivated and moved back to a non-turn position. It will be understood by one having ordinary skill in the art that the rear combination lamp 10 at the rear portion 30 of the vehicle 12 on the left side operates in a similar manner with the first, second and third light-emitting diodes 22, 24, 26 activating sequentially and deactivating simultaneously. A logic circuit is connected with the first light emitting diode 22 that checks the first light-emitting diode 22 and confirms that the first light-emitting diode 22 is operating properly during a turn signal operation.

In addition, the vehicle 12 includes a tail lamp system 90 (FIG. 3) that is connected with the rear combination lamp 10 such that the light-emitting diodes 22, 24, 26 each operate at a 3.5 lumen light output level when the tail lamp system 90 is engaged. The ratio of light output of the rear combination lamp 10 during a turn signal operation is at least five times greater than when the tail lamp system 90 is engaged. This is true during each sequence of the turn signal operation. More specifically, when only the first light emitting diode 22 is activated during the sequential activation of the first, second and third light-emitting diodes 22, 24,26 of a turn signal operation, the light output is more than five times greater than when the tail lamp system 90 is activated. In one embodiment, the first light emitting diode emits 70 lumens during a turn signal operation as compared to the 10.5 lumen total light output provided by the first, second and third light emitting diodes 22, 24, 26 (3.5 lumens each) when the tail lamp system 90 is engaged. Further, when both the first light emitting diode 22 and the second light emitting diode 24 are activated during a turn signal operation, the total light output is 120 lumens which is more than eleven times more light output than the 10.5 lumens when the tail lamp system 90 is engaged. Moreover, when the first, second and third light emitting diodes, 22, 24, 26 are activated the total light output is 170 lumens, which is over 16 times more light output than the 10.5 lumens provided when the tail lamp system 90 is engaged.

The vehicle 12 also includes a braking system 92 (FIG. 3) that is operably coupled with first, second and third light-emitting diodes 22, 24, 26 of the rear combination lamp 10.

When the braking system 92 is engaged all three light-emitting diodes come on simultaneously at the turn signal output levels (70 lumens for the first light-emitting diode 22 and 50 lumens each for light-emitting diodes 24 & 26).

The above description is considered that of the illustrated embodiments only. Modifications of the invention will occur to those skilled in the art and to those who make or use the invention. Therefore, it is understood that the embodiments showing the drawings and described above are merely for illustrative purposes and not intended to limit the scope of the invention, which is defined by the following claims as interpreted according to the principles of patent law, including the Doctrine of Equivalents.

We claim:

1. A rear combination lamp for a vehicle comprising:
   a lamp housing having first, second, and third laterally-aligned light sources;
   a first backup light disposed between the first and second light sources;
   a second backup light disposed between the second and third light sources; and
   a turn signal member operably connected to the first, second, and third light sources, wherein engagement of the turn signal member activates the first, second, and third light sources sequentially.

2. The rear combination lamp of claim 1, wherein the first light-emitting diode is brighter than the second and third light-emitting diodes when the turn signal member is engaged.

3. The rear combination lamp of claim 1, wherein the first light-emitting diode emits 70 lumens when a braking system in the vehicle is engaged and 3.5 lumens when tail lamp system is engaged.

4. The rear combination lamp of claim 1, wherein the first light-emitting diode emits 70 lumens and wherein the second and third light-emitting diodes emit 50 lumens when the vehicle is turning.

5. The rear combination lamp of claim 1, further comprising:
   a lens cover and reflex caps disposed in each of the first, second, and third cavities.

6. The rear combination lamp of claim 1, further comprising:
   a logic circuit operably coupled to the first light-emitting diode that evaluates the first light-emitting diode to confirm that the first light-emitting diode is operative when the turn signal member is engaged.

7. A rear combination lamp for a vehicle comprising:
   an inboard cavity, an intermediate cavity and an outboard cavity horizontally aligned along a rear portion of the vehicle, each cavity including a light emitting diode; and
   a turn signal operably connected to the light emitting diodes in the inboard, intermediate, and outboard cavities, such that the light-emitting diodes in the inboard, intermediate, and outboard cavities activate sequentially and deactivate simultaneously when the turn signal is engaged.

8. The rear combination lamp of claim 7, wherein the first light-emitting diode is brighter than the second and third light-emitting diodes when the turn signal is engaged.

9. The rear combination lamp of claim 7, wherein the first, second and third light-emitting diodes are operably connected with a braking system and a tail lamp system.

10. The rear combination lamp of claim 9, wherein the first light-emitting diode is brighter when the braking system is engaged than when the tail lamp system is engaged by a ratio of 20:1.

11. The rear combination lamp of claim 7, further comprising:
    a tail light cover and reflex caps disposed in each of the first, second, and third cavities.

12. The rear combination lamp of claim 7, wherein the first light-emitting diode emits 70 lumens when a braking system in the vehicle is engaged and 3.5 lumens when a tail lamp system is engaged.

13. The rear combination lamp of claim 7, further comprising:
    a first backup light disposed between the first and second cavities and a second backup light disposed between the second and third cavities.

14. A method for making a rear combination lamp for a vehicle, the method comprising:
    forming first, second, and third laterally-aligned cavities in the rear combination lamp;
    extending a first light-emitting diode into the first cavity;
    extending second and third light-emitting diodes into the second and third cavities, respectively that have a maximum light output that is lower than the maximum light output of the first light-emitting diode;
    providing a turn signal in the vehicle that is operable between a turn position and a non-turn position;
    connecting the turn signal to a modulator that controls operation of the first, second, and third light-emitting diodes;
    instructing the modulator to activate the first, second, and third light-emitting diodes in a sequential order;
    instructing the modulator to keep the first, second, and third light-emitting diodes simultaneously activated for a predetermined length of time; and
    instructing the modulator to simultaneously deactivate the light-emitting diodes for a predetermined length of time.

15. The method of claim 14, further comprising:
    activating the second and third light-emitting diodes at an intensity of 50 lumens each.

16. The method of claim 14, wherein the step of instructing the modulator to activate the first, second and third light-emitting diodes in a sequential order further includes the steps of: activating the first light-emitting diode first, activating the second light-emitting diode second, and activating the third light-emitting diode third.

17. The method of claim 14, further comprising;
    providing a first brake light between the inboard and intermediate cavities, and a second brake light between the intermediate and outboard cavities.

18. The method of claim 14, further comprising:
    activating the first light-emitting diode at an intensity of 70 lumens.

* * * * *